Patented June 25, 1929.

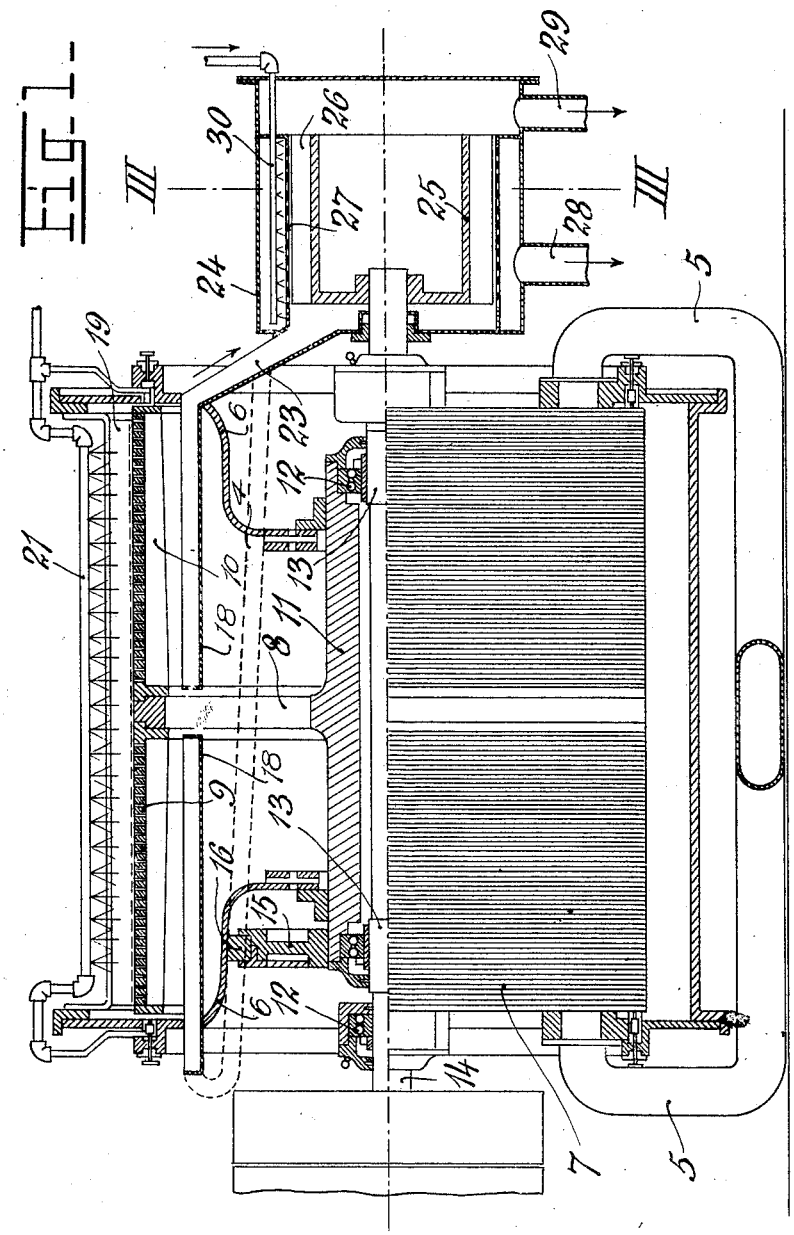

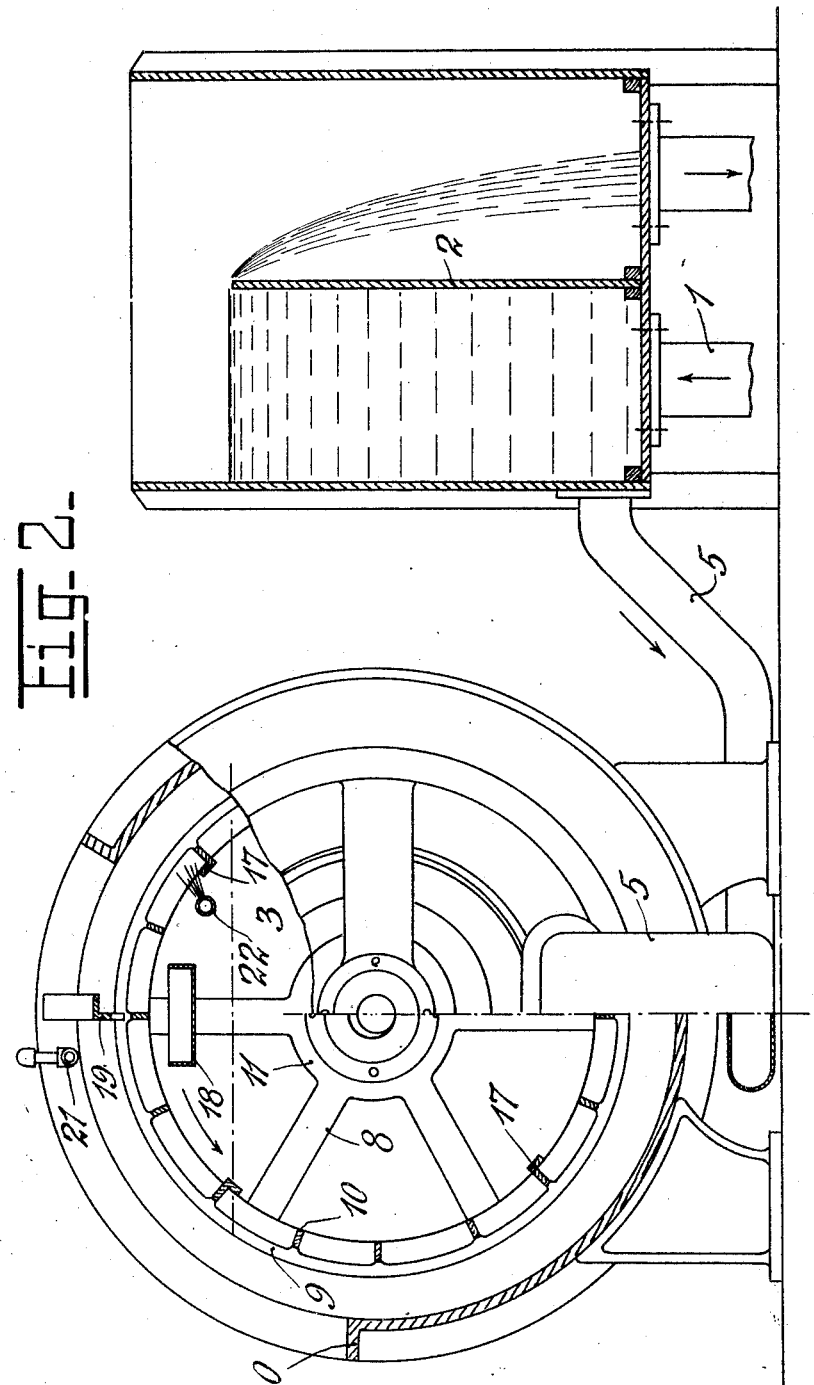

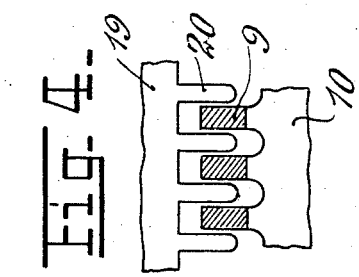
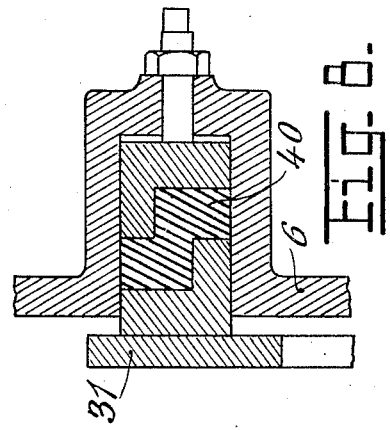
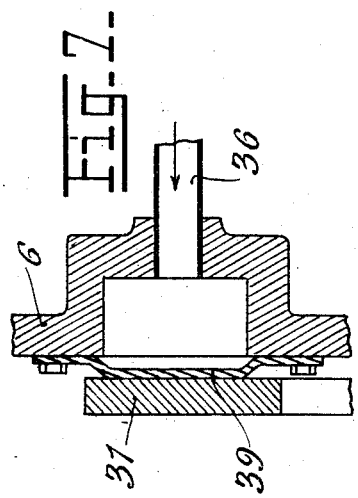
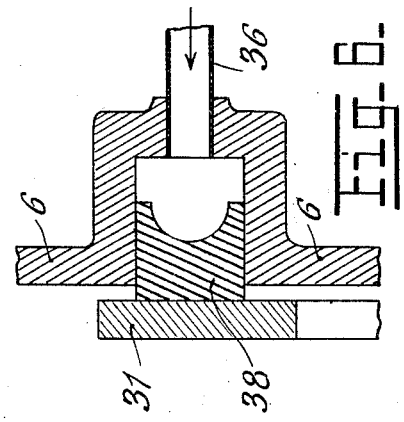
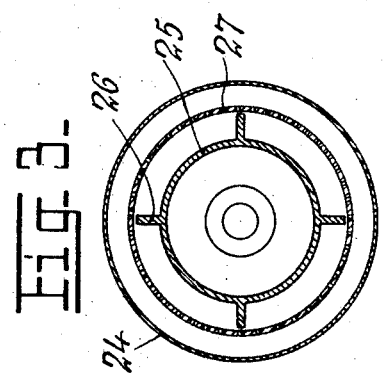
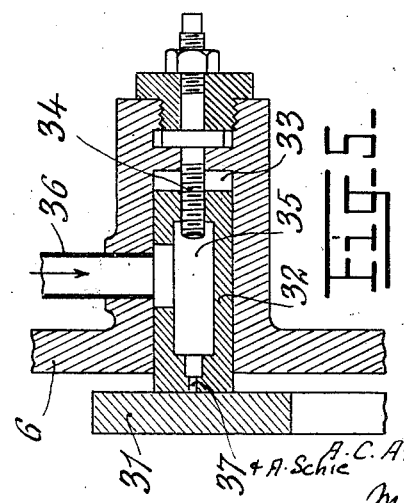

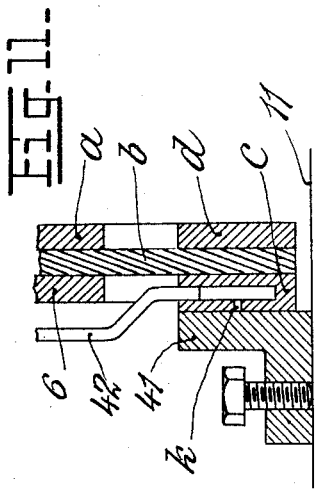
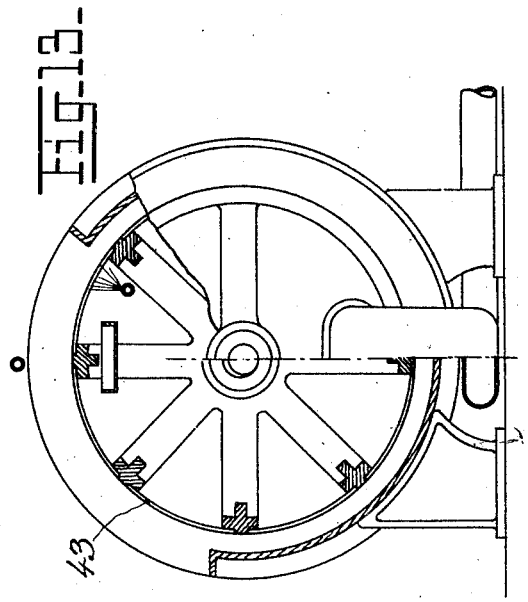
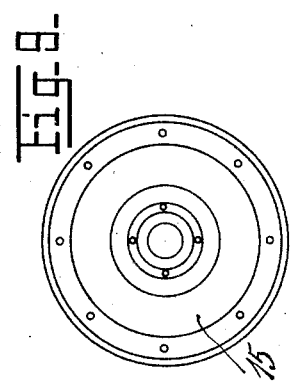
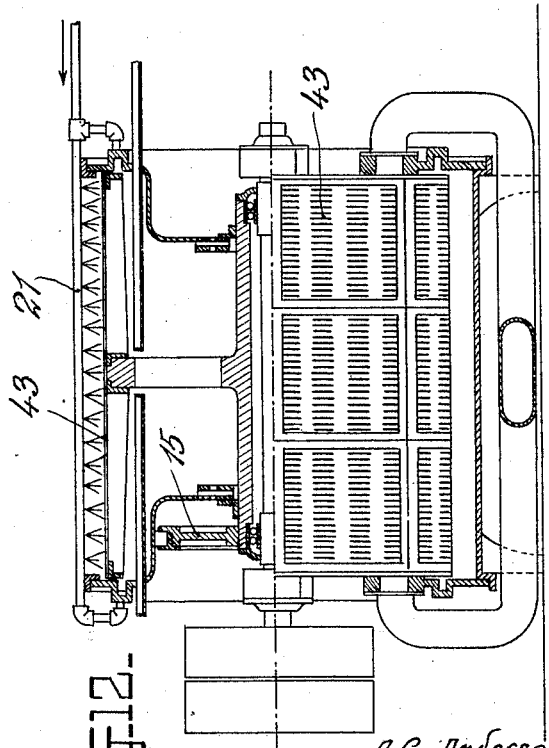

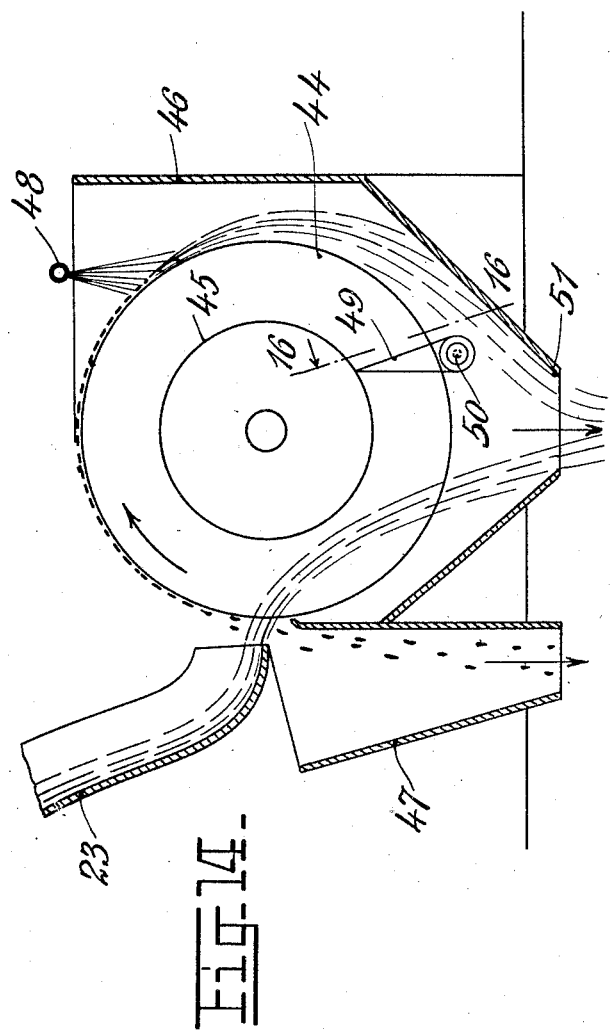

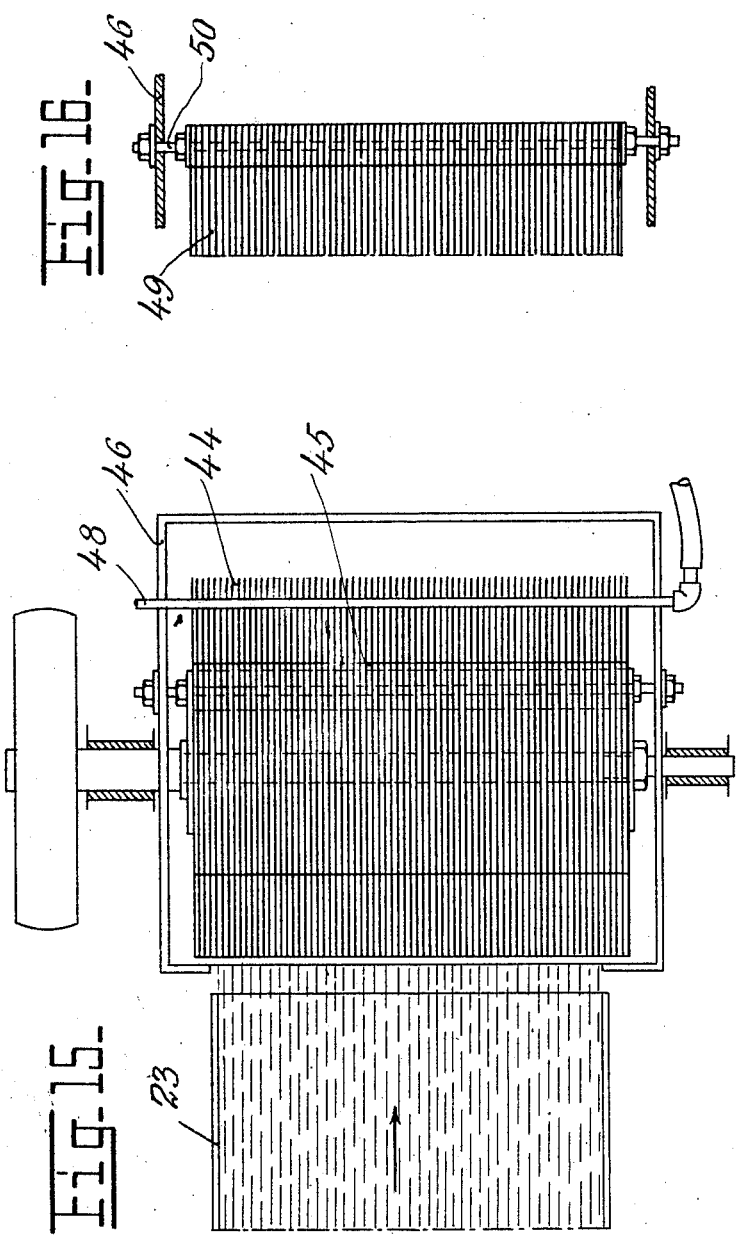

1,718,399

UNITED STATES PATENT OFFICE.

AXEL CHRISTIAN ANDERSEN AND ARNE SCHIE, OF BORREGAARD, NEAR SARPSBORG, NORWAY.

METHOD AND APPARATUS FOR REMOVING KNOTS FROM MECHANICAL AND CHEMICAL WOOD PULP.

Application filed April 28, 1927, Serial No. 187,337, and in Norway December 30, 1925.

The present invention has for its object to provide a method for removing knots of wood from sulphite pulp discharged from the digestors, consequently prior to the treatment of the pulp in grinding mills. The invention also comprises an apparatus for carrying out the said method, further the application of the apparatus as a primary sorter for sulphate and mechanical pulp and as a final sorter for sulphite, sulphate, mechanical pulp and paper pulp.

In the following the invention will be described with reference to the accompanying drawing showing some constructional forms of the apparatus.

Figure 1 is a vertical longitudinal section through one construction of the apparatus and Figure 2 represents a corresponding end view. Figure 3 is a section on the line III—III of Figure 1. Figures 4 to 11 illustrate several details. Figures 12 and 13 are longitudinal section (in the lower part elevation) and end view respectively of a second construction of the apparatus drawn to a smaller scale. Figure 14 is vertical section and Figure 15 plan view of a modified construction. Figure 16 is a portion of a sectional view on the line 16—16 of Figure 14 seen in the direction of the arrow at the section line.

The method is carried out in substantially the following manner:

From the draining basins the pulp is passed through a pipe conduit 1 (Figure 2), water being added, and the pulp enters into an overflow vessel 2, the purpose of which is to maintain a constant level (indicated by dash and dot lines in Figure 2) within the strainer drum casing 4. To this end a pipe 5 connects the overflow vessel 2 to the cylindric drum 7, said pipe disemboguing into the fixed end walls of the drum which is carried by a spider 8 and is built up from rings 9 supported by longitudinal ribs 10. The spider 8 connects the drum fixedly to the hub sleeve 11. This sleeve 11 is by ball or roller bearings 12 supported by excentric pivots 13 forming parts of the driven shaft 14. By the rotation of this shaft 14 the strainer drum therefore receives an excentric shaking motion corresponding to the shape of the excentric pivots, but by means of a disc 15 which is attached to the hub sleeve 11 and carries along its periphery a ring 16 of rubber or another frictioning material, the drum receives during each revolution of shaft 14 a fraction of a revolution about its axis, because the rubber ring 16 during the excentric motion is pressed against the stationary cylinder wall 6 and at each revolution is displaced a small distance relatively to the said wall. The strainer drum therefore receives from the shaft 14 a rapidly oscillating and simultaneously a slowly rotating motion.

The excentricity (or length of stroke) of this motion can, if desired, be adjusted, for instance by means of turnable bearing sleeves which are likewise excentrical.

The strainer drum is provided on its interior side with driver lists 17 taking along with them the knots etc. deposited along the underside of the strainer and discharging these knots into the gutter 18 mounted under the top of the strainer. The gutter 18 is made in two parts as shown in Figure 1 in order to get clear of the rotating drum spider 8.

With the driver lists 17 co-operates a stationary comb 19 (see Figures 1, 2 and 4), which is mounted just above the gutter 18 and the teeth 20 of which project so far down between the rings 9 of the strainer drum that said teeth during the excentric motion of the drum about the shaft 14 will push out any material which might otherwise be left between the rings 9. Besides, in order to clean the strainer spaces between the rings 9, ordinary spraying pipes 21 on the exterior side of the drum and a spraying pipe 22 on the interior side of the drum are arranged.

From the gutter 18 the collected knots are passed by means of a gutter 23 through the stationary drum wall 6 into another stationary drum 24 (Figure 1 and 3) mounted co-axially with the shaft 14. One pivot of this shaft projects into drum 24 and carries a blade drum 25, the blades or shovels 26 of which rotate inside the stationary perforated straining drum 27. Thereby the blades are causing the opened fibre bundles adhering to the discharged knots to pass through the perforations of drum 27 and further out through the pipe 28, whereas the knots are passing out at the end of the drum and are carried away through the pipe 29. Preferably spraying pipes 30 are also arranged in this strainer.

In order to obtain a tight joint between the rotating main drum and its stationary drum walls 6 preferably one of the arrangements shown in Figures 5, 6, 7 and 8 may be used.

According to Figure 5 the numeral 31 represents one of the end plates of the strainer drum. In order to provide a tightening between this movable part 31 and the stationary wall 6 a packing device is arranged consisting of a sliding ring 32 which by means of screws 34 may be adjusted in a corresponding recess 33 made in the wall 6. The ring 32 is provided with an annular chamber 35 supplied through pipe 36 with water under pressure. This water is again forced out into the space between the ring 32 and the strainer plate 31 through holes 37. These water jets will maintain the contacting faces in a clean condition and prevent the fibres from slipping through.

A similar tightening device is shown in Figure 6. But here the packing ring 38 proper (which may consist for instance of rubber) is pressed into engagement with the strainer wall 31 by water under pressure supplied through pipe 36.

Figure 7 illustrates a construction, wherein the packing ring shown in Figure 6 has been replaced by a rubber or leather strip 39 which is fastened on the inside of the drum wall 6 and is under the direct influence of water under pressure in order to provide a tightening against the wall 31 of the strainer drum.

Figure 8 shows another modification wherein, instead of water under pressure an adjustable packing ring with an elastic rubber member 40 is used.

Between the stationary drum wall 6 and the annular flanges (Figure 11) a belt $b$ of balata, rubber or leather is attached. To the interior side a wearing ring $c$ is fastened by means of a flange $d$ and rivets passing through these members. The hub 11 is provided with an adjustable flange 41 which may be pressed against the wearing ring $c$. By means of water under high pressure supplied through pipe 42 and through the perforation $k$ the contacting surfaces are maintained in a clean state and the fibres are prevented from passing through.

Figure 10 shows still a modification of a tightening device between the stationary and the movable part.

The apparatus operates in the following manner:

The pulp mixture coming from the overflow vessel 2 passes through the pipes 5 and through the casing end walls 6 into the drum, wherein the mixture will take a level corresponding to the level of liquid in vessel 2. As a consequence of the excentrically oscillating and rotating motion of the cylindric strainer the most part of the pulp fibres are separated passing out through the spaces between the strainer rings 9 and flowing down into the lower part of the casing below the strainer proper, and from there the pulp is passed out from the apparatus at the overflow $o$ (Figure 2) which may be adjusted in height. The knots and the fibre bundles adhering thereto are collected in the gutter 18 and are conducted to the shovel sorter 25, wherein the adhering fibre bundles are separated from the knots.

The apparatus shown in Figures 12 and 13 differs from that described above substantially in this that instead of a cylindric strainer composed of rings a cylinder surface 43 made from perforated or slotted plates is used, said plates being attached to arms with a T-shaped cross section. In this construction the moving mechanism is the same one as that described above (the wheel 15 is in Figure 9 shown in side view), but the apparatus has no shovel sorting drum such as 25, because it is intended to be used substantially as a primary or as a final sorter.

It will be understood that the shape of the eccentric portions or cam discs 13 of shaft 14 and also the size of their stroke may be varied, whereby the motion of the strainer drum is made more or less shaking according to the nature or state of the material to be treated.

Instead of causing the gutter 18 to collect the mixture of knots and fibre bundles and to conduct same to a rotating shovel drum 25 arranged inside a strainer drum as shown in Figures 1 and 3, the device shown in Figure 14 in elevation and in Figure 15 in plan view may be used. Here the mixture of knots and fibre bundles supplied from the sorting device by means of the gutter 23 is passed to a drum composed of thin disc-shaped lamellæ 44 spaced apart by thin wooden discs 45 as shown diagrammatically in Figure 15. This drum rotates slowly within a casing 46, and the mixture of knots and fibre bundles is supplied nearly at its middle portion as will be seen from Figure 14. The drum rotates in the direction indicated by the arrow. The fibre bundles will adhere to the disc lamellæ 44 and is carried upwards by the drum, whereas the knots and other heavier particles, on account of their higher gravity and shape, are caused to fall down into an outlet 47 arranged outside the casing 46. The fibre bundles adhering to the drum may preferably be washed off by means of a spraying pipe 48. The spaces between the lamellæ 44 are maintained in an unobstructed state by means of scrapers 49 attached to a common shaft 50. The fibre bundles thereby separated from the drum are passing out through the funnel aperture 51 of the casing 46.

In case the apparatus is to be used as a final sorter it may be arranged for straining in the opposite direction. In such case the pulp to be sorted will be supplied to the apparatus outside the strainer drum and the strained material is taken out through the pipes 5. The spraying pipe 21 is arranged inside the drum at the top in order to cause particles adhering between the slots to be sprayed up into a collecting and removing gutter arranged above the straining drum or cylinder.

Claims:

1. In an apparatus of the character described, a casing including end plates, a drum strainer located in said casing and adapted to receive pulp to be treated, a shaft rotatably supporting the drum in said casing, excentric means on said shaft coacting with said drum strainer to effect shaking movement of the latter, and a disc-like element on said drum strainer and coacting with one of the end plates of the casing to effect a relatively small angular movement of the drum strainer at each revolution of the shaft.

2. An apparatus as claimed in claim 1, characterized by the provision of a gutter located within the drum strainer adjacent the upper part of the latter, said drum strainer being ribbed, and a comb entering between the ribs of the drum strainer to effect the displacement of the latter into the gutter.

3. An apparatus as claimed in claim 1, characterized by the provision of means for introducing fluid under pressure into the space between the end plates of the casing and the drum strainer.

4. An apparatus as claimed in claim 1, characterized by the provision of a packing ring interposed between the drum strainer and end plates, and means for maintaining the packing ring in engagement with the drum strainer by fluid pressure.

5. An apparatus as claimed in claim 1, characterized by the provision of a rotating drum including disc lamellæ, an outlet for said drum, and means for conducting material from the drum strainer to the rotating drum, said rotating drum being adapted to cause adherence of the fibre bundles thereto, the knots and other heavier particles being adapted to sink to said outlet.

6. In an apparatus of the character described, a casing including end plates, a shaft journalled in said casing, a hub excentrically mounted on said shaft, a drum strainer carried by said hub, the rotary movement of said shaft effecting a shaking motion of the hub and drum strainer owing to the excentric mounting of the hub, and means interposed between the hub and one end plate of the casing to effect relatively small angular movement of the hub and drum strainer at each revolution of the shaft.

7. In an apparatus of the character described, a casing, a shaft journalled therein, a drum strainer excentrically mounted on the shaft and adapted to be shaken incident to rotary movement of the latter, and means for effecting intermittent rotary movement of the drum strainer incident to shaking movement of the latter, said last mentioned means including a member adapted to have intermittent frequent contact with a portion of said casing.

In testimony whereof we have signed our names to this specification.

AXEL CHRISTIAN ANDERSEN.
ARNE SCHIE.